United States Patent [19]
Rush et al.

[11] Patent Number: 5,232,018
[45] Date of Patent: Aug. 3, 1993

[54] PARALLEL PORTING VALVE ASSEMBLY

[75] Inventors: William F. Rush, Tinley Park, Ill.;
Dennis L. Sadowski, Van Nuys,
Calif.; Hyman A. Todres, Skokie, Ill.

[73] Assignee: Institute of Gas Technology, Chicago, Ill.

[21] Appl. No.: 885,722

[22] Filed: May 18, 1992

Related U.S. Application Data

[63] Continuation-in-part of Ser. No. 646,938, Jan. 29, 1991, abandoned, which is a continuation-in-part of Ser. No. 478,347, Feb. 12, 1990, Pat. No. 4,987,924.

[51] Int. Cl.5 .............................................. F16K 11/20
[52] U.S. Cl. ............................... 137/599; 137/614.17
[58] Field of Search .................... 137/549, 884, 614.17, 137/614.18

[56] References Cited
U.S. PATENT DOCUMENTS 3,010,316 11/1961 Snyder ............................. 137/599 X
3,356,106 12/1967 Riseman et al. ........... 137/614.17 X
4,187,872 2/1980 Freeman et al. ........... 137/614.17 X
4,848,393 7/1989 West ................................. 137/599 X

FOREIGN PATENT DOCUMENTS 2312883 9/1974 Fed. Rep. of
 Germany ...................... 137/614.17
2234044 1/1991 United Kingdom ................. 137/884

Primary Examiner—John C. Fox
Attorney, Agent, or Firm—Speckman, Pauley & Fejer

[57] ABSTRACT

A parallel porting valve assembly having a parallel valve body. The parallel valve body forms an inlet channel cavity and an outlet channel cavity. A plurality of plug valves are each mounted within the parallel valve body between the inlet channel cavity and the outlet channel cavity for selectively permitting an preventing communication between the inlet channel cavity and the outlet channel cavity. An actuator is used to open and close each plug valve.

17 Claims, 4 Drawing Sheets

FIG.IA

PARALLEL PORTING VALVE ASSEMBLY

CROSS REFERENCE TO RELATED APPLICATIONS

This application is a continuation-in-part patent application of our co-pending patent application having Ser. No. 07/646,938, filed Jan. 29, 1991, now abandoned, which is a continuation-in-part patent application of patent application having Ser. No. 07/478,347, filed Feb. 12, 1990, which issued as U.S. Pat. No. 4,987,924 on Jan. 29, 1991.

BACKGROUND OF THE INVENTION

1. Field of the Invention

This invention relates to an interchangeable plug valve having a valve body, an outer valve plug and an inner valve plug. A plurality of interchangeable plug valves are mounted within a parallel valve body to form a parallel porting valve assembly.

2. Description of the Prior Art

Conventional plug valves exist which essentially stop or permit fluid to flow through piping systems. Such valves have particular uses in gas and water distribution piping systems. Conventional magnetic latching valves requiring little power for activation are primarily used in remote locations where electrical power is not readily available. Many electronics manufacturers produce conventional microprocessors capable of encoding and transmitting data signals to and from such latching valves.

Little et al, U.S. Pat. No. 3,734,133 teaches a diverter pinch valve having a hollow Y-shaped resilient valve body. The '133 patent also teaches pinching means used to pinch leg portions to control flow through the Y-shaped valve body. Actuating means are used to selectively move inner and outer pinch bars to provide a gas-tight closure of one resilient leg portion, while simultaneously providing a fully opened passage within the other resilient leg portion.

Neff, U.S. Pat. No. 4,182,360 teaches a combination pressure regulating and flow control valve having an upstream port and a downstream port connected by a fluid passage. An adjustable pressure regulating valve regulates the pressure of a fluid which enters from the upstream port. A spring bias check valve, in parallel with the pressure regulating valve, allows free flow back to an upstream port if the pressure regulating valve is closed to such flow.

Ware, U.S. Pat. No. 4,513,763 discloses an inertial valve apparatus for automatically stopping fluid flow in the event of an earthquake or similar vibration, and simultaneously causing the fluid to vent. The inertial valve apparatus includes a spring-loaded double-seated valve held in an unactuated position by a latch, a suspended mass, and a trigger arm connected to the latch. A vibrating force moves the suspended mass and thus causes the latch to release and move the valve to an actuated position.

Geipel et al, U.S. Pat. No. 4,606,370 teaches a flow-switching water-mixing faucet assembly for a sanitary mixing faucet assembly or the like. A flow shifting valve stem is raised or lowered to shift a fluid flow between two outlets. The faucet assembly basically comprises an operating lever pivotally having one end connected to a valve stem and the opposite end connected to a centrally located pivot bearing.

Bernstein et al, U.S. Pat. No. 4,682,755 discloses a pinch valve mechanism having two cam members rotatably supported in a housing. Rotating the cam members transversely moves opposing shank portions both toward and away from one another. Such motion pinches a sleeve and thereby selectively throttles or stops fluid flow through a piping system.

Plug valves normally service gas and water distribution piping systems. A plug valve generally provides a gas-tight leak-free seal, which has particular importance in natural gas or other flammable fuel piping systems. The existing valves described above have several shortcomings, particularly in gas services. Once installed into the piping system, such valves cannot be easily changed or tested.

SUMMARY OF THE INVENTION

It is an object of this invention to provide an interchangeable plug valve which has parts that can easily be interchanged in the field without the need for any block or bypass valves and without the need for any excavation in order to obtain access to the interchangeable parts.

It is another object of this invention to mount a plurality of interchangeable plug valves within a parallel valve body to form a parallel porting valve assembly.

It is yet another object of this invention to provide a parallel porting valve assembly which allows a plug valve to be interchanged without interrupting continuous fluid flow through the parallel porting valve assembly.

It is yet another object of this invention to provide a parallel porting valve assembly which can be used to remotely test the functioning of each interchangeable plug valve, without interrupting continuous fluid flow service.

It is yet another object of this invention to provide a parallel porting valve assembly which accommodates pressure drop measurements of fluid flow across a valve.

It is yet another object of this invention to provide a parallel porting valve assembly which has a local manual override of remotely controlled functions of each interchangeable plug valve.

It is still another object of this invention to provide an interchangeable plug valve which is used to both locally and/or remotely indicate the open or closed position of the plug valve.

In one preferred embodiment of this invention, an interchangeable automated parallel porting valve has a valve body with a first through hole. An outer valve plug is rotatably and sealably seated inside a first cavity within the valve body. The outer valve plug has a second through hole which rotatably aligns with the first through hole of the valve body. The outer valve plug is seated in a sealed position within the valve body.

An inner valve plug is sealably seated inside a second cavity within the outer valve plug. The inner valve plug has a through channel which is non-rotatably aligned with and in communication with the second through hole of the outer valve plug. The inner valve plug is mounted in a non-rotatable position within the outer valve plug.

The inner valve plug has a slightly tapered locating pin fixedly attached to an off center area of the bottom of the inner valve plug. The bottom of the outer valve plug cavity has a well which extends downward into the outer valve plug. The slightly tapered locating pin of the inner valve plug mates with the well of the outer valve plug. The off-center mating of the locating pin and the well prevents the inner valve plug from rotating with respect to the outer valve plug.

The inner valve plug has a valve stem fixedly attached at the center of the top of the inner valve plug. An elongated stem extension can be attached to the top portion of the valve stem of the inner valve plug. Rotating the stem extension simultaneously rotates the valve stem, the inner valve plug which is non-rotatable with respect to the outer valve plug, and the outer valve plug. Such rotation is an alternate method of aligning the first through hole of the valve body with the second through hole of the outer valve plug. Alternatively, rotating the outer valve plug with the flats on the outside surface of the outer valve plug, or by another manual or automated rotating means familiar to the art, will simultaneously rotate the inner valve plug and the outer valve plug, together as one unit.

An upper portion of the stem extension has a cutout section. A T-bar tool having an elongated base portion and a shortened crossover portion can be inverted and mated with the cutout section of the stem extension. The inner valve plug assembly can be raised and lowered within the valve body by inserting the inverted T-bar into the cutout section on each side of the U-shaped stem extension, rotating or sliding the inverted T-bar within the cutout section, abutting the T-bar with an upper groove formed within the cutout section of the stem extension, and lifting or lowering the T-bar to vertically displace the inner valve plug assembly within the outer valve plug cavity. However, the T-bar, slotted hole and cutout section combination of such embodiment is less susceptible to undesired tampering with the valves, particularly gas distribution valves buried underground.

A remotely operated actuator can be used to extend a plunger within the inner valve plug and thus block the through channel. The actuator is preferably mounted within the second cavity of the outer valve plug, between the top of the inner valve plug and the bottom surface of a locking washer. When engaged within a retaining groove of the outer valve plug, the locking washer retains the inner valve plug in a seated and sealed position within the second cavity of the outer valve plug.

In another embodiment of this invention, the inner valve plug has an elongated upper body which forms a stacked parallel porting valve plug. The inner valve plug has at least one inlet port aligned with one end of the first through hole of the valve body and at least one outlet port aligned with the opposite end of the first through hole of the valve body. The upper body of the inner valve plug has an inlet channel connected to the inlet port and an outlet channel connected to the outlet port. A shutoff plunger or control valve positioned between the inlet channel and the outlet channel is operated between an extended and a retracted position to control fluid flow through the interchangeable plug valve.

In yet another embodiment of this invention, a plurality of inner valve plug and outer valve plug assemblies, as described above, are mounted within a parallel valve body to form a parallel porting valve assembly. Such parallel porting valve assembly has a parallel valve body with an inlet channel cavity and an outlet channel cavity. Each outer valve plug is rotatably and sealably seated within a first cavity of the parallel valve body. One side of the through hole of the outer valve plug aligns with the inlet channel cavity of the parallel valve body. The opposite side of the through hole of the outer valve plug aligns with the outlet channel cavity of the parallel valve body.

The parallel porting valve assembly has at least one inlet access port extending into the inlet channel cavity of the parallel valve body and at least one outlet access port extending into the outlet channel cavity of the parallel valve body. In a preferred embodiment of this invention, at least one pressure transducer is connected to an inlet access port and at least one pressure transducer is connected to an outlet access port. At least one differential pressure transducer is preferably connected between the inlet access port and the outlet access port.

BRIEF DESCRIPTION OF THE DRAWINGS

The above mentioned and other features of this invention and the manner of obtaining them will become more apparent, and the invention itself will be best understood by reference to the following description of specific embodiments taken in conjunction with the drawing, wherein:

FIG. 1A shows a partial sectional view of the inner valve plug along line 1A—1A, as shown in FIG. 1;

DESCRIPTION OF THE PREFERRED EMBODIMENTS

This invention relates to an interchangeable plug valve used to stop or allow fluid flow through a piping system. A plurality of interchangeable plug valves seated and sealed within a parallel ported valve body forms a parallel porting valve assembly. Such interchangeable plug valve and parallel porting valve assembly have particular use in fluid, such as natural gas and water, piping distribution systems. Such piping distribution systems and associated valves are normally buried two feet to eight feet beneath the surface of the ground. Thus testing conventional valves and interchanging various parts within each conventional valve may require extensive ground excavation to expose all conventional valve parts.

This invention eliminates the site visit and the necessary ground excavation associated with testing and interchanging various parts within the buried valve. In normal installations, a "buffalo box" or "curb pipe" fits over the valve stem, abuts a top portion of the buried valve body, and extends upward to the ground surface. The buffalo box or curb pipe, basically a pipe, provides access to the upper parts, interchangeable parts and other components of a buried valve. The parallel porting valve assembly of this invention can be used to eliminate interrupted fluid flow while testing and interchanging various parts within the interchangeable plug valve.

Figure 1:
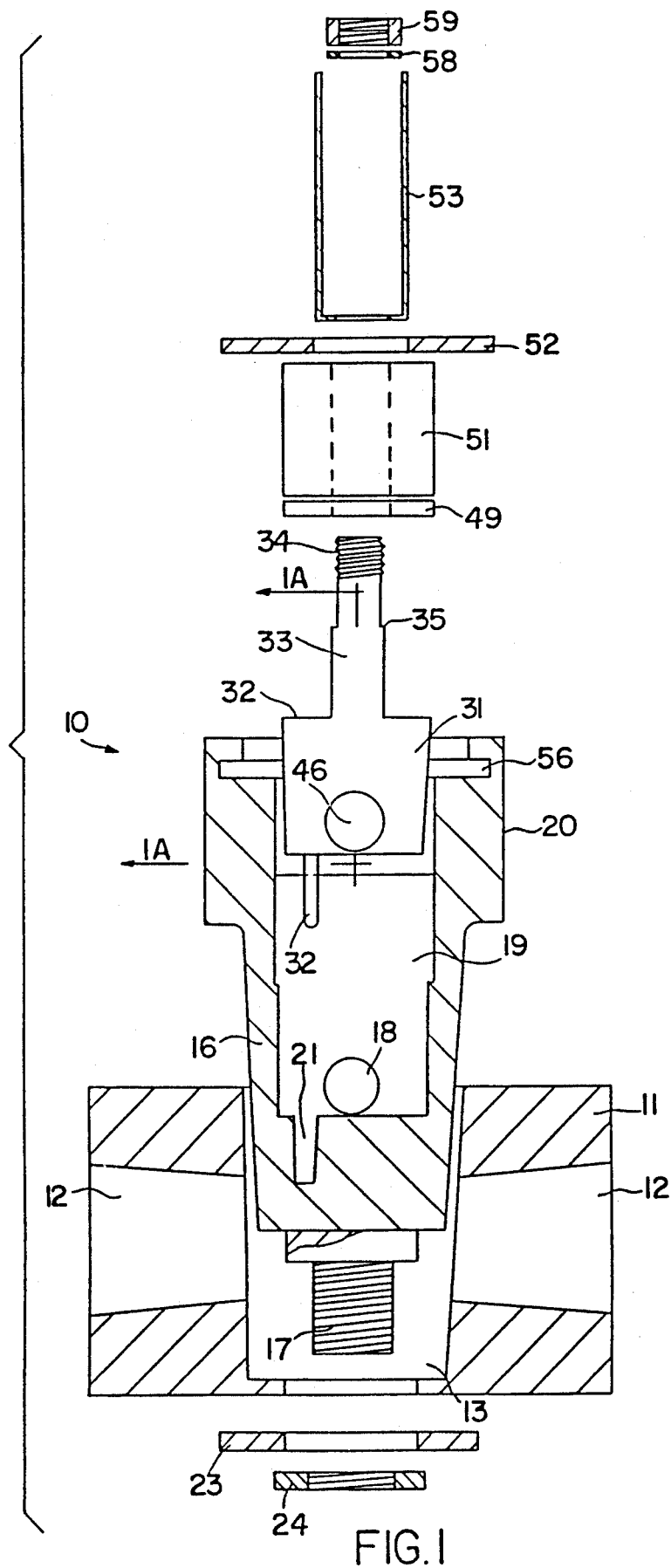
FIG. 1 shows an exploded partial cross-sectional front view of an interchangeable plug valve assembly according to one embodiment of this invention.

FIG. 1 shows an exploded partial cross-sectional front view of an interchangeable plug valve assembly according to one embodiment of this invention. Interchangeable plug valve assembly 10 comprises valve body 11 with first through hole 12 extending through valve body 11. It is apparent that first through hole 12 can either taper toward the center of valve body 11, extend straight through valve body 11, or widen toward the center of valve body 11. First through hole 12 can have either a circular cross section or one or more various non-circular cross sections, preferably a circular cross section.

First cavity 13 extends into valve body 11 approximately perpendicular to the centerline of first through hole 12. Outer valve plug 16 is rotatably and sealably seated within first cavity 13. The outside surface of the lower portion of outer valve plug 16 has a tapered shape and outer valve plug 16 is seated within first cavity 13, which has a mating tapered shape. The outside surface of outer valve plug 1 and the inside surface of first cavity 13 can have suitable non-tapered shapes, but preferably has a tapered shape. In either case, outer valve plug 16 must seat and form a fluid-tight seal within first cavity 13.

Outer valve plug shaft 17 is fixedly attached to the bottom of outer valve plug 16 by a screwed connection, welded connection, by having outer valve plug 16 and outer valve plug shaft 17 one molded piece, or the like. Outer valve plug shaft 17 sealably extends through a hole in the bottom of valve body 11. In an assembled position, second washer 23 fits over outer valve plug shaft 17 and abuts the bottom of valve body 11. The internal threads of second nut 24 matingly engage with external threads on outer valve plug shaft 17. It is apparent that other methods exist for retaining outer valve plug 16 within valve body 11. Second nut 24 can be replaced with a shear pin, retaining clip or the like. In lieu of outer valve plug shaft 17, second washer 23 and second nut 24, a valve-bonnet arrangement located at the upper portion of valve body 11 can also be used to retain outer valve plug 16 within valve body 11. Whichever method is used, it is important that outer valve plug 16 is sealably seated within valve body 11.

Outer valve plug 16 has a second through hole 18, the centerline of which is capable of being aligned parallel to the centerline of first through hole 12 when outer valve plug 16 is seated within first cavity 13 of valve body 11. Second through hole 18 can have a circular or non-circular cross section, preferably a circular cross section.

A single port inner valve plug 31 is shown in FIGS. 1 and 1A, according to one embodiment of this invention, as having through channel 46. In one preferred embodiment of this invention, inner valve plug 31 is a commercially available latching valve operated by a magnetic latching solenoid which lowers or raises a plunger within the body of inner valve plug 31 to open or close, respectively, the passage of through channel 46. For example, a magnetic latching solenoid valve comprising inner valve plug 31, valve stem 33 and actuator 51 is commercially available from a company named EEMCO, from South Bend Controls, Inc. in South Bend, Ind., or from any other latching valve manufacturer. Most magnetic latching solenoid valves operate from a 12-volt power source.

Conventional latching valves are only energized to open or close the valve with the assistance of a holding force which is achieved by either a mechanical means or a permanent magnet. A magnetic latching solenoid is a two coil "push-pull" type solenoid assisted by a permanent magnet to hold a moving armature in an extended or in a retracted position. The magnetic latching solenoid can be attached to various types of valves, such as the valve arrangement shown in FIGS. 1 and 1A, and when combined, the magnetic latching solenoid valve will maintain its last energized position, without requiring a continuous supply of electrical current. Such valve has obvious fail-safe advantages during a power outage or the like.

Actuator 51 preferably comprises two coils. One coil is electrically energized to move an armature and thus shaft 55 and plunger 56 to an extended position which forces plunger 56 downward to close or block through channel 46. Magnet 49, as shown in FIG. 1, then holds the armature in a fixed position so that the first coil can be de-energized. To open plunger 56 and thus through channel 46, as shown in FIG. 1A, the second coil is electrically energized to overcome the combined magnetic latching force and external load to move the armature and thus shaft 55 and plunger 56 to a retracted position. Magnet 49 then holds the armature in such retracted position so that the second coil can be de-energized.

A single port inner valve plug 31 having through channel 46 is non-rotatably and sealably seated within second cavity 19 of outer valve plug 16. Through channel 46 of inner valve plug 31 is non-rotatably aligned with second through hole 18 of outer valve plug 16. Inner valve plug 31, which is non-rotatable with respect to outer valve plug 16, rotates with outer valve plug 16 as a single unit and thus in an aligned position allows fluid to flow through first through hole 12, second through hole 18 and through channel 46.

Locating pin 32 is fixedly attached to an off-center portion of the bottom of inner valve plug 31. Outer valve plug 16 has well 21 which extends downward into the bottom of second cavity 19. Well 21 mates with downwardly extending locating pin 32 and, in the seated position of inner valve plug 31, prevents rotation of inner valve plug 31 with respect to outer valve plug 16. Thus, rotating valve stem 33 causes inner valve plug 31 to rotate and because inner valve plug 31 does not rotate with respect to outer valve plug 16, also causes outer valve plug 16 to rotate within valve body 11. The outside surface of the upper portion of outer valve plug 16 has flats 20 for manually rotating outer valve plug 16. Rotating outer valve plug 16 using flats 20, or another rotating means familiar to the art, will simultaneously rotate inner valve plug 31 and outer valve plug 16 and will also exert less stress and torque on valve stem 33.

Figure 2:
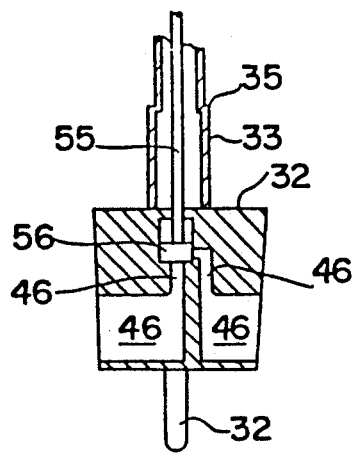
FIG. 2 shows a partial cross-sectional front view of a dead-end inner valve plug having no through hole according to one embodiment of this invention.
Figure 2:
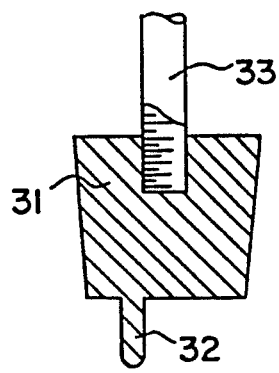

A dead-end inner valve plug 31, as shown in FIG. 2, can be interchanged with a single port inner valve plug 31, as shown in FIG. 1. A dead-end inner valve plug 31 can either non-rotatably seat or rotatably seat within second cavity 19 of outer valve plug 16. A dead-end inner valve plug 31 has no through holes or channels and thus allows no fluid flow through interchangeable plug valve 10, regardless of whether the dead-end inner valve plug 31 is non-rotatably or rotatably mounted within second cavity 19. A dead-end inner valve plug 31 may be used to prevent flow through a plug valve installed in a piping distributing system such as a gas or water service piping system that has been permanently taken out of service.

In a preferred embodiment of this invention, elongated valve stem 33 is fixedly attached to the center of the top of inner valve plug 31. It is apparent that valve stem 33 can be attached to the top of inner valve plug 31 by various methods such as a screwed connection, adhesive connection, welded connection, by having valve stem 33 and inner valve plug 31 one molded piece, or the like. Actuator 51 fits within second cavity 19 between the top of inner valve plug 31 and the bottom of flat locking washer 52. It is apparent that actuator 51 can be an electric solenoid, a magnetic latching solenoid, or any other suitable actuator means known to the art, preferably a magnetic latching solenoid which requires a relatively low operating power supply and does not change an opened or closed position upon loss of power. Magnet 49 is positioned between an upper shoulder of inner valve plug 31 and a bottom surface of actuator 51, as shown in FIG. 1. As discussed above, magnet 49 is used to hold plunger 56 in either an extended or a retracted position.

Figure 11:
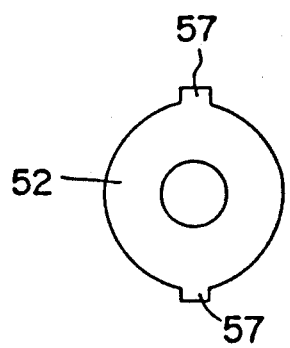
FIG. 11 shows a top view of a flat locking washer according to one embodiment of this invention.

In one preferred embodiment of this invention, the lower portion of valve stem 33 has a larger diameter than the upper portion of valve stem 33, as shown in FIG. 1. Flat locking washer 52 has a centered through hole which fits over valve stem 33. Flat locking washer 52 locks within locking groove 56 which is located in the upper portion of outer valve plug 16. A top view of flat locking washer 52 is shown in FIG. 11. Retaining groove 56, as shown in FIG. 1, has a corresponding shape to accommodate and lock flat locking washer 52, relative to the body of outer valve plug 16. It is apparent that other suitable locking washer arrangements, familiar to those skilled in the art, can be used. In one preferred embodiment of this invention, a bottom surface of flat locking washer 52 abuts the top surface of actuator 51 and thereby seats and sealably retains inner valve plug 31 and actuator 51 within second cavity 19. The bottom of stem extension 53 abuts shoulder 35 formed between the lower portion and upper portion of valve stem 33.

It is apparent that the positions of actuator 51 and flat locking washer 52, as shown in FIG. 1, can be interchanged. In such interchanged position, flat locking washer 52 fits over valve stem 33 and abuts the top of inner valve plug 31 thereby seating and sealably retaining inner valve plug 31 within second cavity 19. Also in such interchanged position, flat locking washer 52 is positioned within retaining groove 56 which is positioned just above top surface 32 of inner valve plug 32. Also in such interchanged position, actuator 51 fits over valve stem 33, outside of second cavity 19.

When a single port inner valve plug 31 is non-rotatably seated within second cavity 19 of outer valve plug 16, aligning first through hole 12, second through hole 18 and through channel 46 will allow fluid to flow through interchangeable plug valve 10 as long as plunger 56 is in a retracted or open position. Outer valve plug 16, rotated to a closed position in which no cross-sectional portion of second through hole 18 aligns with any cross-sectional portion of first through hole 12, will stop or prevent fluid flow through interchangeable plug valve 10. In such closed position of outer valve plug 16, inner valve plug 31 or actuator 51 can be interchanged or otherwise disassembled without having any fluid leakage from plug valve assembly 10. Once inner valve plug 31 has been interchanged or reassembled, rotating outer plug valve 16 to an open position where second through hole 18 aligns with first through hole 12 will again cause fluid to flow through interchangeable plug valve 10, if inner valve plug 31 has an open single port or through channel 46.

Threaded top portion 34 of valve stem 33 extends above flat locking washer 52, in the assembled position of plug valve 10. The bottom plate of stem extension 53 has a centered through hole. The bottom plate of stem extension 53 fits over valve stem 33 such that the bottom plate abuts the top surface of actuator 51. First washer 58 fits over threaded top portion 34 and abuts the top surface of the bottom plate of stem extension 53. The internal threads of first nut 59 matingly engage with the external threads of threaded top portion 34. It is apparent that other methods exist for extending valve stem 33. Such methods may include several screwed extension pieces of valve stem 33, a one-piece valve stem 33 extending to any desired length, or the like.

Figure 12:
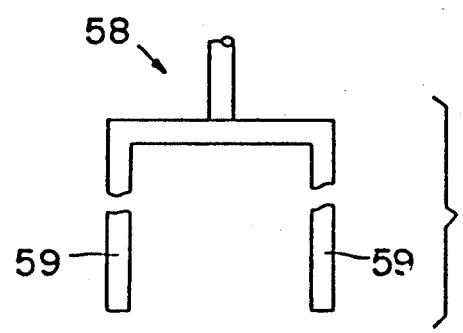
FIG. 12 shows a front view of an inverted U-shaped tool according to one embodiment of this invention.

Flat locking washer 52 lockingly fits within retaining groove 56 of outer valve plug 16. Rotating flat locking washer 52 moves locking lugs 57, as shown in FIG. 11, of flat locking washer 52 into a snug position within retaining groove 56. U-shaped tool 58, as shown in FIG. 12, can be used to rotate flat locking washer 52 when the interchangeable valve is buried and virtually inaccessible, except through a "curb-pipe" or "buffalo box". Prongs 59 of U-shaped tool 58 engage with locking lugs 57 to rotate flat locking washer 52. Prongs 59 of U-shaped tool 58 engage with locking lugs 57 by having the length of locking lugs 57 slightly greater than the depth of retaining groove 56. Such slight difference in length creates a gap between the circumferential edge of locking washer 52 and the body of outer valve plug 16 and such gap accommodates the width or diameter dimension of prong 59. Thus, prongs 59 of U-shaped tool 58 fit within such gap so that U-shaped tool 58 can be used to rotate flat locking washer 52 when lugs 57 are within retaining groove 56. It is apparent that other methods such as screwed fittings, flanges and the like, can be used to retain flat locking washer 52 in a locked position with respect to outer valve plug 16.

Figure 9:
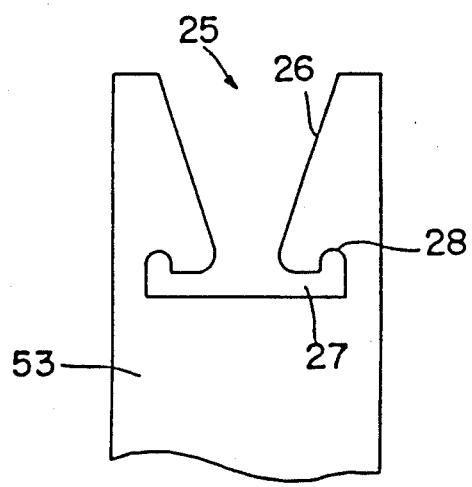
FIG. 9 shows a side view of the top portion of a stem extension according to one embodiment of this invention.
Figure 10:
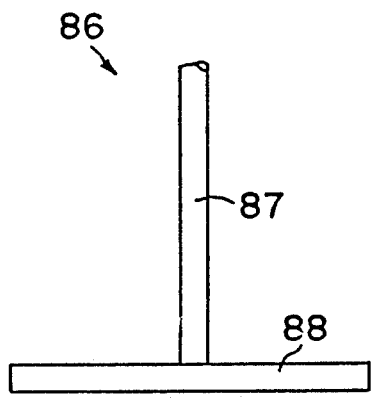
FIG. 10 shows a front view of a T-bar tool according to one embodiment of this invention.

An upper portion of stem extension 53 has cutout section 25, as shown in the side view of FIG. 9, which shows an upper section of one prong of stem extension 53. T-bar tool 86 has elongated base portion 87 and shortened crossover portion 88 which can be inverted and mated with cutout section 25 of stem extension 53. Downward sloping guides 26 of cutout section 25 direct T-bar tool 86 into channel 27. Once T-bar tool 86 is in a position to form contact with channel 27, T-bar tool 86 can either be rotated so that crossover portion 88 fits within diametrically opposed grooves 28 or horizontally displaced so that crossover portion 88 fits within two grooves 28 located on the same side of each upper portion of stem extension 53.

Inner valve plug 31 and actuator 51 can be raised and lowered within valve body 11 by inserting the inverted T-bar tool 86 into grooves 28 of cutout section 25 and lifting or lowering T-bar tool 86 to vertically displace inner valve plug 31 and actuator 51 within outer valve plug 16. It is apparent that other methods exist for vertically displacing inner valve plug 31 and actuator 51 within outer valve plug 16, such as a ring matingly threaded into the top of valve stem 33 and a hooked tool fitting the ring, an extended valve stem 33, and the like. However, the T-bar tool 86 and cutout section 25 combination is less susceptible to undesired tampering with the valves, particularly gas distribution valves buried below ground.

Figure 4:
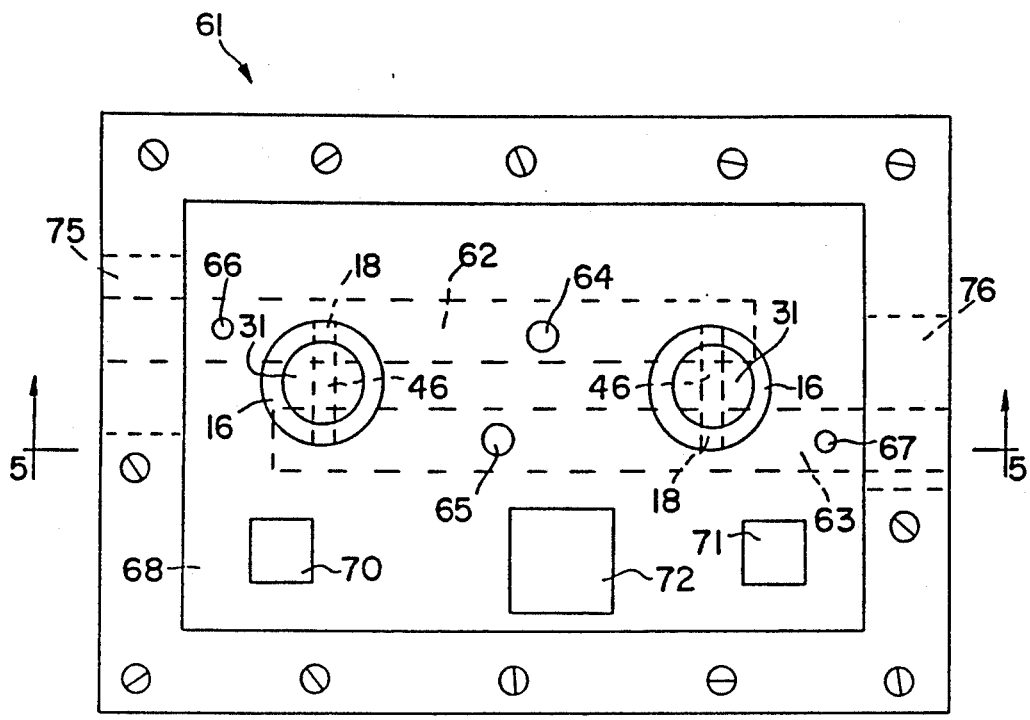
FIG. 4 shows a top view of a side-by-side parallel porting valve assembly according to one embodiment of this invention.
Figure 5:
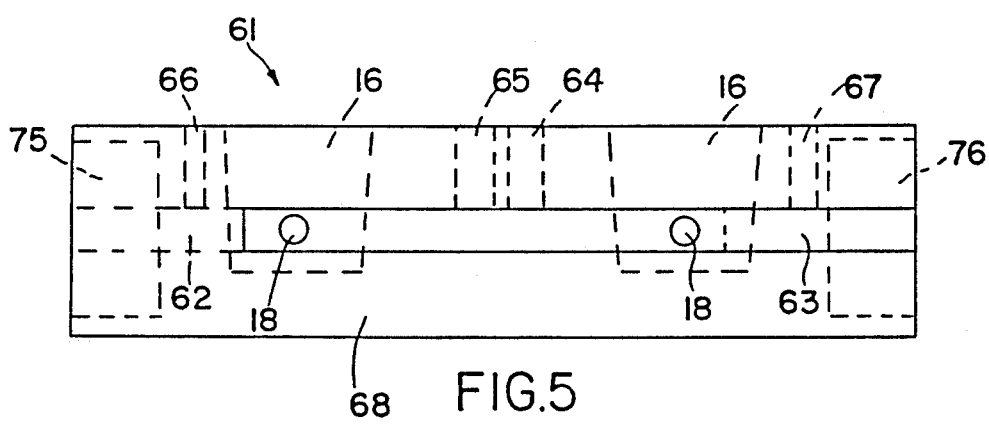
FIG. 5 shows a cross-sectional front view of the parallel valve body along line 5—5 as shown in FIG. 4, to simplify the drawing, FIG. 5 does not show the outer valve plug, inner valve plug, actuator or flat locking washer, as shown in FIG. 1, and FIG. 5 does not show crosshatch lines but rather shows hidden lines, for clarity purposes.

FIG. 4 shows a top view of a side-by-side parallel porting valve assembly according to one embodiment of this invention. FIG. 5 shows a cross-sectional view, along line 5—5 as shown in FIG. 4, of a parallel porting valve assembly as shown in FIG. 4. Inlet channel cavity 62 and outlet channel cavity 63 extend into parallel valve body 68. Inlet chamber 75 and outlet chamber 76 of parallel valve body 68 can be sealably mated with any standard pipe connection, such as a threaded joint, compression joint or fusion joint. A plurality of outer valve plugs 16 are each rotatably and sealably seated within parallel valve body 68. One side of second through hole 18 of outer valve plug 16 aligns with inlet channel cavity 62 of parallel valve body 68. The opposite side of second through hole 18 of outer valve plug 16 aligns with outlet channel cavity 63 of parallel valve body 68. Through channel 46 of inner valve plug 31 non-rotatably aligns with second through hole 18 of outer valve plug 16. In such aligned position, fluid flow enters inlet channel cavity 62, flows through second through hole 18 and through channel 46, then into outlet channel cavity 63.

Since a plurality, preferably two or three, of interchangeable plug valves 10 seat within parallel valve body 68, one outer valve plug 16 can be rotated to a closed position and thus stop fluid flow through the same interchangeable plug valve 10. Fluid will continue to flow through parallel valve body 68 when at least one interchangeable plug valve 10 has outer valve plug 16 rotated to an open position where second through hole 18 of outer valve plug 16 and through channel 46 of inner valve plug 31 align with inlet channel cavity 62 a: d outlet channel cavity 63, within parallel valve body 68.

To simplify the drawing, FIG. 5 shows a cross-sectional front view of parallel valve body 68 and FIG. 5 does not show outer valve plug 16, inner valve plug 31, actuator 51 or flat locking washer 52 FIG. 5 also does not show crosshatch lines, but rather shows hidden lines, for clarity purposes. FIG. 5 shows inlet access port 64 extending from an outer surface of parallel valve body 68 to inlet channel cavity 62. Outlet access port 65 extends from an outside surface of parallel valve body 68 to outlet channel cavity 63. Outlet pressure transducer 70 attaches to parallel valve body 68 and can be connected with tubing from inlet access port 64. Outlet pressure transducer 71 attaches to parallel valve body 68 and can be connected with tubing from outlet access port 65. In one embodiment of this invention, if inlet access port 64 and outlet access port 65 of parallel valve body 68 are not connected to an absolute or differential pressure device or another measuring device, then inlet access port 64 and outlet access port 65 must be sealed with a plug or another sealing means.

Differential pressure transducer 72 can be attached to parallel valve body 68 and can be connected with tubing from both inlet access port 64 and outlet access port 65. Thus, inlet pressure transducer 70 can provide a pressure measurement reading from inlet channel cavity 62. Outlet pressure transducer 71 can provide a pressure measurement reading from outlet channel cavity 63. Differential pressure transducer 72 can provide a differential pressure measurement reading between inlet channel cavity 62 and outlet channel cavity 63. It is apparent that various control systems can provide measurement readings of fluid properties within parallel valve body 68 and likewise be used to remotely control actuator 51.

Inlet wiring access port 66 extends from an outside surface of parallel valve body 68 to inlet channel cavity 62. Outlet wiring access port 68 extends from an outside surface of parallel valve body 68 to inlet channel cavity 63. Wiring access ports 66, 67 allow tracer or auxiliary wires to be exposed within channel cavities 62, 63, without having fluid leakage.

It is apparent that side-by-side parallel porting valve assembly 61 may have various configurations of inlet channel cavity 62 and outlet channel cavity 63. Inlet channel cavity 62 and outlet channel cavity 63 can have various shapes and configurations and can be located at different levels within parallel valve body 68. However situated, it is important that inlet channel cavity 62 communicate with second through hole 18 of each outer valve plug 16, in the open or flowing position of outer valve plug 16. Likewise, it is important that outlet channel cavity 63 communicate with the opposite end of second through hole 18 of each outer valve plug 16, when outer valve plug 16 is in the open or flowing position.

Figure 3:
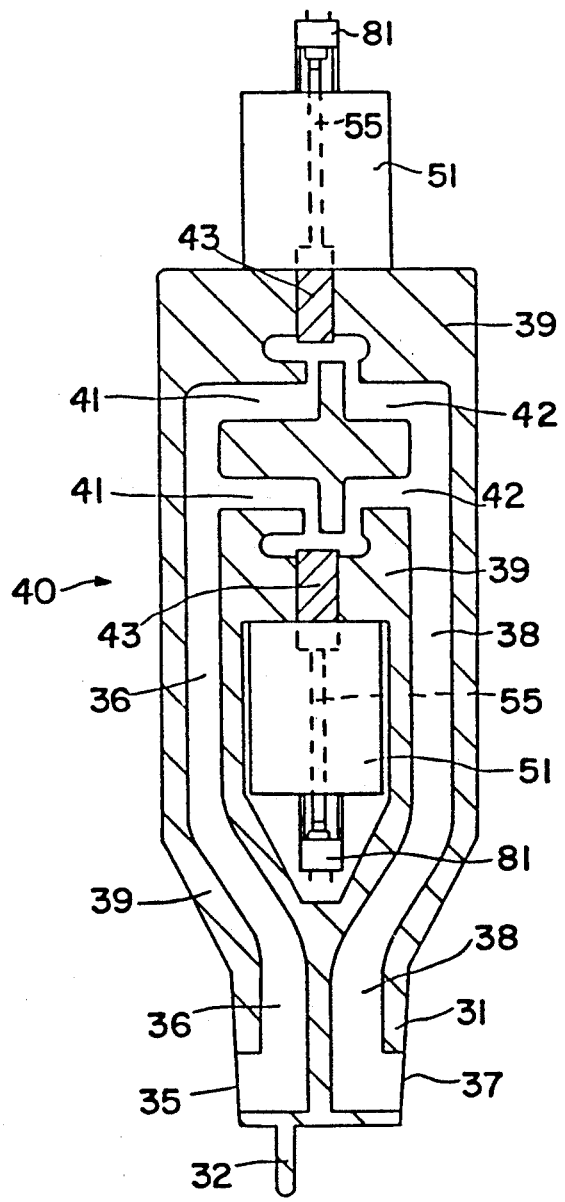
FIG. 3 shows a front view of a stacked parallel porting inner valve plug according to one embodiment of this invention.

Parallel porting valve assembly 61 can have other configurations, such as the embodiment of an inner valve plug 31 shown in FIG. 3 incorporated into outer valve plug 16 as shown in FIG. 1. FIG. 3 shows a cross-sectional front view of a stacked parallel porting inner valve plug forming a stacked parallel porting valve assembly 40 when incorporated into outer valve plug 16. Inlet port 35 is located on one side of inner valve plug 31. Inlet channel cavity 36 is in communication with inlet port 35. As shown in FIG. 3, inlet channel 36 extends upward within upper body 39. Inlet channel cavity 36 is in communication with a vertically stacked plurality of branches 41.

Outlet port 37 is located on the side of inner valve plug 31 which is opposite inlet port 35. Outlet channel cavity 38 is in communication with outlet port 37. As shown in FIG. 3, outlet channel cavity 38 extends upward within upper body 39. Outlet channel cavity 38 is in communication with a vertically stacked plurality of branches 42.

Inlet channel cavity branch 41 and outlet channel cavity branch 42 both extend as far as plungers 43. Plungers 43 are extended and retracted in the same manner as plunger 56, to move plungers 43 within the overall channel system and thus control fluid flow from inlet port 35, inlet channel cavity 36 and inlet channel cavity branch 41 to outlet channel cavity branch 42, outlet channel cavity 38 and outlet port 37. Thus, magnetic latching actuators 51 operate plungers 43 in a retracted or an extended position to either allow or prevent fluid flow, respectively, through stacked parallel porting valve assembly 40. Position indicators 81 show the retracted or extended position of plungers 43.

It is apparent that inlet channel cavity 36, inlet channel cavity branch 41, outlet channel cavity branch 42 and outlet channel cavity 38 can also be formed by tubing manifolds, hoses and the like, in lieu of the various channels formed within upper body 39. It is also apparent that ports 35, 37, channel cavities 36, 38, and channel cavity branches 41, 42, can have various configurations and cross sections. It is an important aspect of this invention to have fluid flow from inlet port 35 to outlet port 37 with a valving means located at some point between both ports 35, 37. It is apparent that plungers 43 can have either an overall plug-type shape, globe shape, gate shape, or the like, so long as plungers 43 can effectively control flow and be remotely operated.

Figure 6:
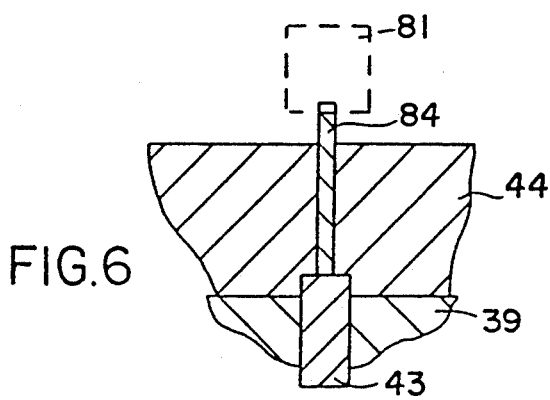
FIG. 6 shows a cross-sectional front view of a position indicator according to one embodiment of this invention.
Figure 7:
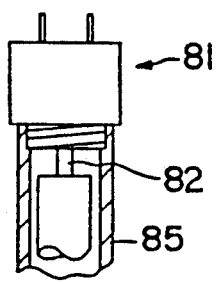
FIG. 7 shows a partial cross-sectional side view of a mounted electromechanical plunger switch according to one embodiment of this invention.
Figure 8:
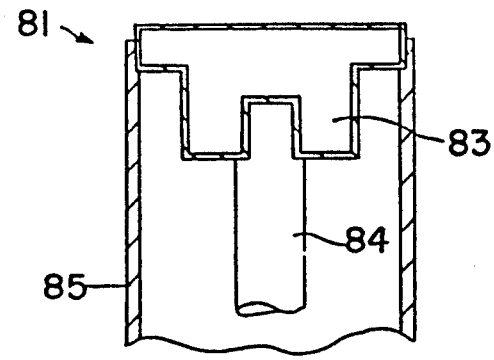
FIG. 8 shows a partial cross-sectional front view of an emitter-detector position indicator according to one embodiment of this invention.

FIGS. 6, 7 and 8 further describe position indicator 81. FIG. 6 shows a partial cross-sectional front view of position indicator 81, according to one embodiment of this invention. Adjustable pin 84 is fixedly attached to plunger 43. It is apparent that adjustable pin 84 can be attached to plunger 43 by various methods such as a welded connection, screwed connection, adhesive connection, by having adjustable pin 84 and plunger 43 one molded piece or the like. As plunger 43 is vertically displaced, adjustable pin 84 follows such vertical displacement. Thus the top of adjustable pin 84 is vertically displaced along with plunger 43.

FIG. 7 shows a front view of an electromechanical plunger switch. As shown in FIG. 7, the electromechanical plunger switch has plunger 82 and a threaded bushing which is threaded into the top of shaft 85. Shaft 85 encases adjustable pin 84 and can form a gas-tight seal. In the top dead-center position of adjustable pin 84, as shown in FIG. 7, the top of adjustable pin 84 depresses plunger 82 and the electromechanical switch emits a signal that plunger 43 is in a retracted and thus open position. When plunger 43 is extended and adjustable pin 84 vertically drops, a non-depressed plunger 82 and the electromechanical switch indicates that plunger 43 is in the extended and thus closed position.

FIG. 8 shows a partial cross-sectional front view of an infrared beam emitter-detector which is another position indicator, known within the art. Emitter-detector 83 preferably comprises a gas-tight chamber forming a seal with shaft 85. As adjustable pin 84 and plunger 43 vertically drop into the extended or closed position of plunger 43, and infrared beam within emitter-detector 83 travels from the emitter to the detector and thus detects the closed position of plunger 43. Likewise, in the top dead-center position of adjustable pin 84, an interrupted infrared beam detects the open position of plunger 43. It is apparent that other methods can be used to detect the position of plunger 43 from both a local and remote location. It is also apparent that adjustable pin 84 can extend upward as afar as necessary, such as aboveground, to provide a local and physical position indicator for plunger 43; such an extended adjustable pin 84 may or may not be mechanically combined with position indicator 81.

With the pressure transducers, wiring access ports, actuators and position indicators of parallel porting valve assemblies 40 or 61 as described above, this invention allows remote as well as local testing and functioning of valves, without interrupting fluid flow service. The testing is accomplished by closing one actuator 51, either remotely or locally verifying its position, opening the same actuator 51 and repeating such procedure with another actuator 51 of the same parallel porting valve assembly. This invention also allows interchangeability of valve components without interrupting fluid flow.

An interchangeable plug valve according to this invention also has an advantage of measuring fluid flow through the interchangeable plug valve using absolute or differential pressure transducers. It is known that flow through an orifice relates to a pressure drop across an orifice. since the valve or plunger seats of this invention comprise flow restricting orifices, the differential pressure between inlet channel cavity 36 and outlet channel cavity 38 is proportional to and can be used to indicate the flowrate of fluid through an open interchangeable plug valve assembly 10.

A parallel port valve according to this invention can function as a variable size orifice. As the fluid flowrate decreases, the differential pressure across the orifice decreases and becomes difficult to measure. In such low fluid flowrate situations, one or more of the ports can be closed and thus decrease the overall area between inlet port 35 and outlet port 37 and thereby increase the fluid flowrate and provide more accurate measurements of the fluid flowrate through the parallel port valve.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

We claim:

1. A parallel porting valve assembly comprising:
   a parallel valve body having an inlet channel cavity and an outlet channel cavity;
   at least one plug valve having a plug valve inlet port, a plug valve outlet port and a plug valve cavity, said plug valve mounted within said parallel valve body between said inlet channel cavity and said outlet channel cavity for selectively permitting and preventing communication between said inlet channel cavity and said outlet channel cavity;
   an inner valve plug disposed within said plug valve cavity, said inner valve plug having an upper body, an inner valve plug inlet port and an inner valve plug outlet port, said upper body forming at least two communication channels between said inner valve plug inlet port and said inner valve plug outlet port, said inner valve plug positioned such that said inner valve plug inlet port is in communication with said plug valve inlet port and said inner valve plug outlet port is in communication with said plug valve outlet port; and
   actuating means for opening and closing said plug valve.

2. A parallel porting valve assembly according to claim 1 wherein said parallel valve body has a plurality of first cavities, and each said plug valve is an interchangeable plug valve comprising:

an outer valve plug having a through hole and a second cavity, said outer valve plug rotatably and sealably seated within a corresponding first cavity of said first cavities; rotating means for rotating said outer valve plug and forming communication between said inlet channel cavity, said outlet channel cavity, and said through hole;

first retaining means for retaining said outer valve plug in a seated and sealed position within said corresponding first cavity;

an inner valve plug having a through channel nonrotatably aligned with said through hole of said outer valve plug, said inner valve plug being nonrotatable with respect to said outer valve plug; and second retaining means for seating and sealing said inner valve plug within said second cavity of said outer valve plug, said second retaining means comprising a flat locking washer having a centered through hole and a plurality of locking lugs, a valve stem secured to said inner valve plug, said valve stem extending through said centered through hole, and said locking lugs lockable within a retaining groove of said outer valve plug.

3. A parallel porting valve assembly according to claim 2 further comprising lifting means secured to each said valve stem for raising and lowering each said inner valve plug with respect to each corresponding said outer valve plug.

4. A parallel porting valve assembly according to claim 3 wherein said lifting means comprises an elongated stem extension attached to each said valve stem.

5. A parallel porting valve assembly according to claim 4 wherein said lifting means further comprises: a T-bar tool having an elongated base portion and a shortened crossover portion, a plurality of vertical legs of said stem extension each having a cutout section at an upper portion, said cutout section forming a downward sloping guide, a channel, and at least one groove located in an upper side of said channel, and said T-bar tool inversely mateable with said groove whereby vertically displacing said T-bar tool vertically displaces said stem extension.

6. A parallel porting valve assembly according to claim 4 wherein said rotating means comprises: said elongated stem extension attached to a bottom plate having a bottom plate through hole, each said valve stem having a threaded top portion extending through said bottom plate through hole, a first washer fitting over said threaded top portion and abutting said bottom plate, and a first nut matingly engageable with said threaded top portion.

7. An interchangeable plug valve according to claim 2 wherein said first retaining means further comprises:

an externally threaded outer valve plug shaft fixedly attached to a bottom of said outer valve plug, said outer valve plug shaft extending through said bottom of said parallel valve body;

a washer, a nut, said washer fitting over said externally threaded outer valve plug shaft and abutting said valve body, and said nut matingly engageable with said externally threaded outer valve plug shaft.

8. A parallel porting valve assembly according to claim 2 wherein said flat locking washer has two said locking lugs, and said locking lugs when positioned within said retaining groove are mateable with prongs of a U-shaped tool to rotate said flat locking washer.

9. A parallel porting valve assembly according to claim 2 wherein said actuating means comprises an actuator positioned within said second cavity of said outer valve plug between a top of said inner valve plug and a bottom surface of said flat locking washer.

10. A parallel porting valve assembly according to claim 2 wherein said inner valve plug further comprises: a downwardly extending locating pin fixedly attached to an off-center area of a bottom surface of said inner valve plug, and said outer valve plug having a well mating with said locating pin of said inner valve plug.

11. A parallel porting valve assembly according to claim 2 further comprising: a plunger mounted to a shaft of said actuating means, and said actuating means raising and lowering said shaft and said plunger within said inner plug valve to open and close communication through said through channel.

12. A parallel porting valve assembly according to claim 1 wherein said inner valve plug further comprises at least one plunger and a shaft secured to said plunger, said actuating means for opening and closing said plug valve raising and lowering said shaft and said plunger within said upper body between said inner valve plug inlet port and said inner valve plug outlet port to open and close communication between said plug valve inlet port and said plug valve outlet port.

13. A parallel porting valve assembly according to claim 1 wherein said actuating means for opening and closing said plug valve comprises at least one actuator mounted in a fixed position with respect to said upper body so as to open and close said inner valve plug.

14. A parallel porting valve assembly according to claim 1 further comprising at least one position indicator mounted in a fixed position with respect to a shaft, said shaft engageable with said position indicator for indicating one of an open position and a closed position of said plug valve.

15. A parallel porting valve assembly according to claim 1 further comprising said plug valve rotatably and sealably seated within said parallel valve body, rotating means for rotatably aligning said plug valve inlet port with said inlet channel cavity and said plug valve outlet port with said outlet channel cavity, and retaining means for retaining said plug valve in a seated and sealed position within said parallel valve body cavity.

16. A parallel porting valve assembly according to claim 15 wherein said inner valve plug further comprises: a downwardly extending locating pin fixedly attached to an off-center area of a bottom surface of said inner valve plug, and said plug valve having a well mating with said locating pin of said inner valve plug.

17. A parallel porting valve assembly according to claim 15 wherein said retaining means further comprises:

an externally threaded plug valve shaft fixedly attached to a bottom of said plug valve, said plug valve shaft extending through a bottom of said parallel valve body; and a washer, a nut, said washer positioned over said externally threaded plug valve shaft and abutting said parallel valve body, and said nut matingly engageable with said externally threaded plug valve shaft.

* * * * *